Feb. 3, 1959

H. D. ECKHARDT 2,872,134

CONTROL APPARATUS FOR AIRCRAFT AND MEANS FOR VARYING
THE LIMITS OF ITS GAIN CONTROL

Filed May 8, 1953

INVENTOR.
HOMER D. ECKHARDT
BY
George H. Fisher
ATTORNEY

United States Patent Office 2,872,134
Patented Feb. 3, 1959

2,872,134

CONTROL APPARATUS FOR AIRCRAFT AND MEANS FOR VARYING THE LIMITS OF ITS GAIN CONTROL

Homer D. Eckhardt, Binghamton, N. Y., assignor to Minneapolis-Honeywell Regulator Company, Minneapolis, Minn., a corporation of Delaware Application May 8, 1953, Serial No. 353,750

8 Claims. (Cl. 244—77)

This invention relates to the field of automatic aircraft control systems and particularly to improvements in the control apparatus of the Automatic Instrument Landing System such as is described in the Alderson et al. patent application, Serial No. 49,442, filed September 15, 1948, and assigned to the assignee of the present application. This invention includes a novel gain control apparatus with means for varying the limits of the gain control while maintaining a constant sensitivity of the control.

An object of the invention is to provide in aircraft control systems a device for limiting the bank angle of aircraft without reducing the sensitivity of the control system.

A more specific object of the invention is to provide in aircraft control systems a means for adjusting the limits of the output signal independently of the sensitivity of the system.

Another specific object of the invention is to provide in a control system, a gain control having a variable sensitivity and adjustable limits, wherein the adjustment of the limits does not affect the sensitivity of the system.

For a better understanding of the invention, reference may be had to the following description, and the accompanying drawing in which.

Figure 1:
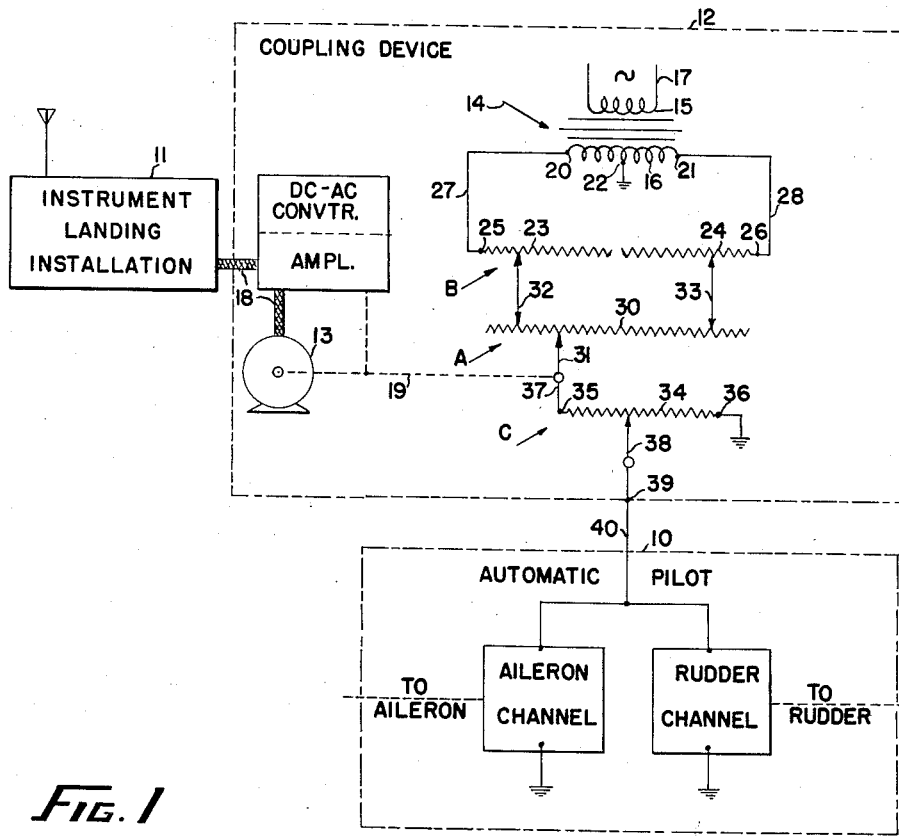
Figure 1 is a diagrammatic representation of gain control apparatus and illustrating the application of my invention in an instrument landing system.

Referring to Figure 1, there is shown a block diagram of an instrument landing system for airborne craft which includes an automatic pilot 10, an instrument landing installation 11 for detecting departure of the craft from a predetermined path in azimuth and elevation, and coupling means 12 for bringing about adjustment of the former under the control of the latter. Instrument landing systems are not new, and the previously mentioned Alderson patent application shows in more detail a system such as applicant has shown in block form. Briefly however the instrument landing equipment 11 includes a receiver which is connected to the coupling means 12. The coupling means includes a converter for changing D. C. signals from the receiver to A. C. signals, a phase sensitive amplifier and a motor 13. Radio signals from a transmitter, not shown, are received by the instrument landing equipment, and converted to usable error signals which are coupled to the automatic pilot to correct the errors in azimuth heading and elevation of the aircraft.

In the dotted square 12 labelled "Coupling Device" there is shown a transformer 14 comprising a primary winding 15 and a secondary winding 16. The primary winding is energized by a suitable source of A. C. potential. The secondary winding includes two terminals 20 and 21 and a center tap 22 which is directly connected to ground. Also shown as part of the coupling device are two voltage dividers A and B. Voltage divider B has a resistance winding which has an open circuit intermediate its ends and thus has two resistance segments 23 and 24. The terminals 25 and 26 of the voltage divider B are connected to the terminals 20 and 21 of the transformer secondary winding by conductors 27 and 28 respectively. The voltage divider A comprises a winding 30 and wiper 31. Wiper 31 is connected to the coupling motor 13 by a mechanical linkage and is adjusted along winding 30 by the operation of the motor. In addition voltage dividers A and B have two adjustable limit wipers 32 and 33 which are common to both voltage dividers, that is, the limit wiper 32 contacts the windings 23 and 30 and the limit wiper 33 contacts the windings 24 and 30. The wiper 32 and the wiper 33 may be adjusted independently of each other. A sensitivity voltage divider C has a resistance winding 34 which has a terminal 35 connected to the wiper 31 by a conductor 37, and a terminal 36 which is grounded. Voltage divider C also includes a wiper 38 which is connected to an output terminal 39.

Figure 2:
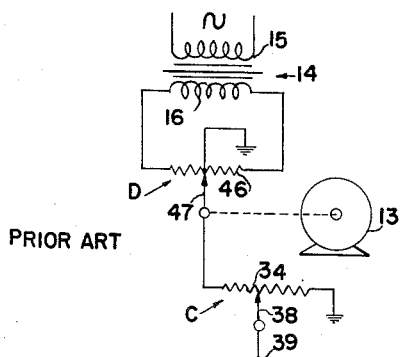
Figure 2 is an example of prior gain control art.

Figure 2 shows an example of prior gain control art which has been replaced by the coupling device 12 shown within the square of Figure 1.

Transformer 14 is energized from the alternating source and energizes the secondary winding 16. A current path or loop can be traced from terminal 20 of the winding 16, through conductor 27, voltage divider winding 23, limit wiper 32, voltage divider winding 30, limit wiper 33, voltage divider winding 24, and conductor 28 back to the secondary winding at terminal 21. Voltage dividers B and A are constructed so that resistance elements 23, 24, and 30 all have equal resistace per unit length. Let us adjust limit wiper 32 in a direction away from terminal 25 of winding 23. It can be seen that the resistance between terminal 25 and wiper 32 will be increasing as the wiper is adjusted, however at the time the resistance of winding 23 is being increased the resistance between limit wipers 32 and 33 on winding 30 is being decreased by an equal amount. Conversely as limit wiper 32 is moved towards terminal 25 and the resistance between terminal 25 and wiper 32 decreases there is a corresponding and equal increase in the resistance between wipers 32 and 33 on winding 30. The same would be true for an adjustment of limit wiper 33. It can now be appreciated that the total resistance of the current loop is always constant regardless of the settings of the limit wipers 32 and 33, therefore, the voltage drop per unit length of the voltage divider winding 30 or as it is commonly called the "volts per turn" developed on the winding 30 between the limit wipers always remains constant for all settings of the limit wipers. Although the volts per turn on winding 30 between the wipers is constant, the maximum voltages obtainable on wiper 31 would be those existing on the limit wipers. Thus if wipers 32 and 33 are set at the extremes of winding 30 a large maximum voltage will be obtainable on wiper 31, and as the wipers 32 and 33 are adjusted towards the center of winding 30 the maximum voltage obtainable on wiper 31 will get progressively smaller.

An unbalance or error signal received by the instrument landing equipment 11 is effective to energize coupling motor 13 through the control cable 18 and motor 13 operates to adjust wiper 31 along resistance winding 30. The center of winding 30 is a null voltage point with respect to ground and with no error signal present motor 13 keeps wiper 31 adjusted to the no signal point. As wiper 31 is adjusted the voltage obtained on wiper 31 is of one phase or the opposite phase depending on which direction the slider 31 is driven and the voltage is of a magnitude proportional to the amount of displacement of wiper 31 from the center of winding 30. The amount of displacement is proportional to the magnitude of the error signal from the instrument landing equipment. The voltage picked up by wiper 31 is applied across the voltage divider C and thus to the automatic pilot network by means of wiper 38 and conductor 40. Voltage divider C is the sensitivity control and wiper 38 may be set for any desired sensitivity. The sensitivity control is adjusted so that a desired bank angle of the aircraft is produced by a given magnitude of error signal. For example, if an error signal displaces wiper 31 by one unit and thus produces a 10° bank angle of the aircraft when the sensitivity adjustment is set at maximum, it may be desirable to reduce the sensitivity setting to the point where the same error signal causes a 5° bank angle of the aircraft. Now under our example one unit of displacement produces a 5° bank angle, two units of displacement produce 10° bank angle and eight units of displacement produce a 40° bank angle. It is desirable, however, to limit the maximum bank angle of the aircraft to a considerably smaller value, let us say 20°. This is accomplished in this invention by limiting the voltage output from the voltage divider A by proper adjustment of the limit wipers 32 and 33, thus limiting the voltage applied to the automatic pilot. This limiting action is possible since when wiper 31 is adjusted past wipers 32 or 33 there no longer is an increase in voltage with increased displacement of wiper 31 but in fact a slight decrease due to the voltage drop in the winding. One method of adjusting the limits is to run the wiper 31 to the left end of winding 30 and adjust limit wiper 32 until the desired maximum voltage required to cause a 20° bank angle of the aircraft appears at wiper 31. Then wiper 31 is run to the right end of winding 30 and limit wiper 33 is adjusted until the desired maximum voltage to cause a 20° bank in the opposite direction appears at wiper 31. Since adjustment of the limit wiper does not affect the sensitivity of the system it can be seen that an error signal causing one unit displacement of wiper 31 still causes a 5° bank, and a four unit displacement causes a 20° bank, but a stronger error signal causing a displacement of wiper 31 in excess of four units will not increase the bank of the aircraft in excess of 20° since the limit wipers have been set to prevent such excessive maneuvers of the aircraft.

Now referring to Figure 2 which shows an example of prior art for comparison purposes with applicant's invention, Figure 2 could be substituted for coupling device 12 and motor 13, and was used in similar systems prior to applicant's invention. In order to limit the bank angle with this device the wiper 47 is run to one end of winding 46 and then wiper 38 of sensitivity voltage divider C is adjusted until the maximum allowable voltage appears on wiper 38. The disadvantage to limiting in this manner is that the sensitivity control becomes the limiting device and the sensitivity of the system becomes dependent on the allowable maximum signal to the automatic pilot, while in the applicant's invention the sensitivity control is independent of the limiting means.

In general while I have shown certain specific embodiments of my invention, it is to be understood that this is for the purposes of illustration and that my invention is to be limited solely by the scope of the appended claims.

I claim as my invention:

1. Air craft control apparatus comprising in combination: means for adjusting the attitude of an aircraft about an axis thereof in accordance with a voltage; means producing a signal which varies with a condition of flight of the craft; coupling means connected to the above named means for supplying a voltage to cause adjustment of said attitude in a proportion to said condition of flight, said coupling means including a source of voltage, and a pair of impedance elements having the same resistance per unit length, a first of said impedance elements having an open circuit intermediate its ends, means connecting said elements in a series circuit with said source, a pair of adjustable wiper means each making electrical contact from one to another of said impedance elements and adjustable along said elements to adjust the limits of voltage output available from the second of said elements by increasing the effective length of the first of said elements and simultaneously decreasing the effective length of the second of said elements so that the resistance of said series circuit remains constant, whereby the voltage gradient along said series circuit remains constant regardless of the adjustment of said adjustable means, and further wiper means adjustable along the entire length of said second element in accordance with said signal to supply an output voltage for controlling adjustment of said first named means.

2. Variable limit voltage divider means comprising in combination: a source of electrical potential; a first impedance element; a wiper associated with said element from which the electrical output of the voltage divider is taken which wiper may be displaced along said element while remaining in electrical contact therewith; a second impedance element mechanically aligned with said first element, said impedance element being connected to said source of potential and having an open circuit intermediate its ends; and two further wipers for connecting said first impedance element to said second impedance element and for varying the limits of the electrical output of said voltage divider, said further wipers being individually adjustable along said elements while remaining in continuous electrical engagement therewith, each of which when adjusted moves simultaneously along said first and second elements, so that the portion of said voltage divider between said further wipers maintains a constant potential difference per unit length.

3. Variable limit voltage divider means comprising in combination: a source of electrical potential; first, second, and third impedance elements, said elements having equal resistance per unit length; means connecting said source to said second and third elements; wiper means associated with said first impedance element from which the electrical output of the voltage divider is taken which wiper may be displaced along said element while remaining in electrical contact therewith; first adjustable contact means for varying a limit of the electrical output of the voltage divider which contact means makes contact with said first and second impedance elements and when adjusted moves simultaneously and equally along both of said elements; and second adjustable contact means for varying a second limit of the electrical output of the voltage divider which makes contact with said first and third impedance elements and when adjusted moves simultaneously and equally along both of said elements so that the portion of said voltage divider between said contact means maintains a constant potential difference per unit length.

4. Variable limit voltage divider means comprising in combination: a source of electrical potential; first, second, and third impedance elements, said elements having equal resistance per unit length, said second and third elements each having an end terminal connected to said source of potential to energize said voltage divider means; a wiper associated with said first impedance element from which the electrical output of the voltage divider is taken which wiper may be displaced along said element while remaining in electrical contact therewith; a first adjustable contact means for varying a limit of the electrical output of the voltage divider which makes contact with said first and second impedance elements and when adjusted moves simultaneously and equally along both of said elements; and a second adjustable contact means for varying a second limit of the electrical output of the voltage divider which makes contact with said first and third impedance elements and when adjusted moves simultaneously and equally along both of said elements, said elements being so arranged that the total effective resistance of the voltage divider is unchanged by the adjustment of said second and third contact means, and so that the portion of said voltage divider between said contact means remains constant per unit length.

5. Variable limit gain control apparatus comprising in combination: a source of electrical potential; a first voltage divider means energized by said potential including an impedance winding having two terminals and an open circuit at the center of said winding; circuit means connecting said terminals to said source of potential; a second voltage divider means mechanically aligned with said first voltage divider means comprising an impedance winding and a wiper from which the electrical output is taken, which wiper may be adjusted along said winding while remaining in electrical contact therewith to vary the magnitude of the output signal; and a pair of adjustable wipers for varying the limits of the electrical output of the apparatus, which wipers make electrical contact with the windings of both of said voltage divider means and each of which wipers when adjusted is moved simultaneously along the windings of the first and second voltage dividers, so that the portion of said voltage divider between said pair of adjustable wipers maintains a constant potential per unit length.

6. Control apparatus comprising: a source of alternating potential; variable limit voltage divider means including first and second impedance elements mechanically aligned with each other, said second impedance element having an open circuit intermediate its ends; circuit means connecting said voltage divider means to said potential source; wiper means associated with said first impedance element from which the electrical output of the apparatus is taken, said wiper being adjustable along said element to produce an output potential therefrom of a magnitude and phase depending on the amount and direction of displacement of said wiper; and first and second adjustable contact means each of which makes electrical contact with said first and second impedance elements and when adjusted moves simultaneously along both of said elements for varying the limits of the electrical output of the voltage divider.

7. Aircraft control apparatus comprising in combination: means for adjusting the attitude of an aircraft about an axis thereof in accordance with a voltage; means producing a signal which varies with a condition of flight of the craft; and coupling means connecting the above named means for supplying a voltage to cause adjustment of said attitude in a variable proportion to said condition, said coupling means comprising a source of alternating potential, variable limit voltage divider means including first and second impedance elements mechanically aligned with each other, said second impedance element having an open circuit intermediate its ends, circuit means connecting said voltage divider means to said potential source, wiper means contacting said first impedance element from which the electrical output of said coupling means is taken to cause adjustment of said attitude, said wiper being adjustable along said element to produce an output potential therefrom of a magnitude and phase depending on the amount and direction of displacement of said wiper, adjusting means for adjusting said wiper in accordance with said means producing a signal, first and second adjustable contact means each of which makes electrical contact with said first and second impedance elements and when adjusted moves simultaneously along both of said elements for varying the limits of said electrical output of said coupling means.

8. Aircraft control apparatus comprising in combination: means for adjusting the bank angle of an aircraft in accordance with a voltage; means producing a signal which varies with a condition of flight of the craft; and coupling means connected to the above named means for supplying a voltage to cause adjustment of said bank angle in a proportion to said condition of flight, said coupling means including a source of voltage and a plurality of resistance elements having the same linear resistivity, means including a pair of adjustable means connecting said elements in a series circuit with said source, said adjustable means each making contact from one to another of said resistance elements and adjustable along said elements to change the limits of voltage output available from the second of said elements by increasing the effective length of a first of said elements and simultaneously decreasing the effective length of a second of said elements so that the resistance of said series circuit remains constant, whereby the voltage gradient along said series circuit remains constant regardless of the adjustment of said adjustable means, further adjustable means adjustable along the entire length of said second element in accordance with said signal to supply an output voltage for said first named means, said first adjustable means limiting the voltage on said second resistance element thereby controlling the maximum voltage available from said coupling means to said first named means and thus limiting the maximum bank angle of the craft without changing said proportion.

References Cited in the file of this patent

UNITED STATES PATENTS

| | | |
|---|---|---|
| 2,452,311 | Markusen | Oct. 26, 1948 |
| 2,511,924 | Lee | June 20, 1950 |
| 2,670,454 | Wilson | Feb. 23, 1954 |
| 2,701,853 | Souczek | Feb. 8, 1955 |